(12) United States Patent
Hardesty et al.

(10) Patent No.: US 7,217,905 B2
(45) Date of Patent: May 15, 2007

(54) WELD FILLER METAL THAT REDUCES RESIDUAL STRESS AND DISTORTION

(75) Inventors: Jeffrey B. Hardesty, Byron, MI (US); David E. Nelson, Waterford, MI (US)

(73) Assignee: Delphi Technologies, Inc., Troy, MI (US)

( * ) Notice: Subject to any disclaimer, the term of this patent is extended or adjusted under 35 U.S.C. 154(b) by 185 days.

(21) Appl. No.: 10/696,402

(22) Filed: Oct. 29, 2003

(65) Prior Publication Data

US 2005/0095165 A1    May 5, 2005

(51) Int. Cl.
*B32B 15/01* (2006.01)
*B23K 35/22* (2006.01)
*C22C 38/28* (2006.01)

(52) U.S. Cl. .................... 219/146.41; 219/146.21; 219/137 WM; 428/682; 428/683; 428/684; 428/685; 148/325

(58) Field of Classification Search ........... 219/146.23, 219/146.41; 428/683–685; 148/325
See application file for complete search history.

(56) References Cited

U.S. PATENT DOCUMENTS

| | | | |
|---|---|---|---|
| 3,770,394 A * | 11/1973 | Bressanelli ................ | 428/586 |
| 4,295,769 A | 10/1981 | Douthett et al. | |
| 4,348,131 A | 9/1982 | Shimanuki et al. | |
| 4,609,577 A | 9/1986 | Long | |
| 4,952,769 A | 8/1990 | Acheson | |
| 5,124,529 A * | 6/1992 | Nishikawa et al. ..... | 219/146.22 |
| 5,221,818 A | 6/1993 | Jusionis et al. | |
| 5,296,677 A | 3/1994 | Takahashi et al. | |
| 5,397,653 A | 3/1995 | Clark et al. | |
| 5,711,474 A | 1/1998 | Hummel | |
| 5,718,776 A | 2/1998 | Yoshie et al. | |
| 5,858,129 A | 1/1999 | Kobayashi et al. | |
| 5,879,480 A | 3/1999 | Hetzner | |

(Continued)

FOREIGN PATENT DOCUMENTS

JP        356105456   *   8/1981   ................ 420/70

(Continued)

OTHER PUBLICATIONS

Stainless steel metal cored wires for welding automotive exhaust systems by Stanley E. Ferree and Michael S. Sierdzinski, ESAB Welding and Cutting Products, Hanover (PA), USA 2000.

*Primary Examiner*—Deborah Yee
(74) *Attorney, Agent, or Firm*—Paul L. Marshall

(57) ABSTRACT

A filler metal including not more than about 0.1% C, not more than about 1.0% Si; not more than about 0.8% Mn; from about 10.5% to about 13.0% Cr; from about 0.65% to about 4.0% Ni; from about 10(% C) to about 1.5% Ti; not more than about 0.5% each of N, S, P, Mo, Nb, Cu, V, or Co; and balance essentially Fe, wherein a weld test pad of the filler metal contains a microstructure comprising martensite. A method of attaching together two components using a modified filler metal which forms a weld containing an amount of martensite sufficient to increase the volume of the weld thereby at least partially offsetting shrinkage of the weld upon cooling, and articles produced thereby.

18 Claims, 1 Drawing Sheet

U.S. PATENT DOCUMENTS

| | | |
|---|---|---|
| 6,042,782 A | 3/2000 | Murata et al. |
| 6,159,310 A * | 12/2000 | Inoue et al. ................ 148/325 |
| 6,204,477 B1 | 3/2001 | Lai |
| 6,295,708 B1 | 10/2001 | Spaid et al. |
| 6,391,187 B1 | 5/2002 | Eklund et al. |
| 6,520,432 B2 | 2/2003 | Molnar |
| 6,552,294 B1 | 4/2003 | Ananthanarayanan et al. |
| 6,589,671 B1 | 7/2003 | Kehrer |
| 6,608,284 B1 | 8/2003 | Nikodym |
| 2001/0030004 A1 | 10/2001 | Kushida et al. |

FOREIGN PATENT DOCUMENTS

| | | | | |
|---|---|---|---|---|
| JP | 358174554 | * | 10/1983 | .................. 420/34 |
| JP | 362124218 | * | 6/1987 | |
| JP | 363171857 | * | 7/1988 | |
| JP | 401246343 | * | 10/1989 | |
| JP | 2000094182 | * | 4/2000 | |

* cited by examiner

WELD FILLER METAL THAT REDUCES RESIDUAL STRESS AND DISTORTION

FIELD OF THE INVENTION

The present invention relates to a weld filler metal that reduces residual stress and distortion. More specifically, the present invention relates to weld filler metal compositions which, in welded form, contain an amount of low carbon martensite sufficient to overcome shrinkage of the weld associated with cooling. The present invention also relates to methods for welding steel components together using the described weld filler metal.

BACKGROUND OF THE INVENTION

Stainless steels are usually welded by using filler metal compositions fundamentally the same as that of the base stainless steel. In accordance with certain welding operations, shrinkage of the weld upon cooling may cause distortion in the welded article. For example, 409 stainless steel filler metal is frequently used to weld stainless steel components together. 409SS solidifies as ferrite and remains ferrite during cooling to room temperature. As the 409SS material cools, it also shrinks thereby causing tensile residual stresses in the base metal components. These residual stresses can cause distortion in the part.

Residual stresses and the resulting distortion from the welded article can be particularly problematic in welding flanges to exhaust components for an exhaust system of an automobile. Flange flatness is particularly critical to insure that there is no leakage around the seals. If the flange is not flat enough due to distortion from shrinkage of the weld, leakage around the seals can cause emission failures. Efforts to prevent excessive warpage have been directed to the use of a thicker flange material which increases the cost and weight of the flange.

U.S. Patent Application Publication No. 2001/0030004 to Kushida et al. discloses a large-diameter, thick-wall martensitic stainless steel welded pipe for conveying crude oil or natural gas. The base metal is a stainless steel having a full martensite phase or a martensite phase as the main constituent with a ferrite phase contained therein and a seam weld metal which is stainless steel having a martensite phase as the main constituent with an austenite phase contained therein. The large diameter, thick wall pipe is not susceptible to distortion from shrinkage of the weld.

Accordingly, there is a need to provide a welded article that is less susceptible to residual stress and distortion without significantly increasing the cost or weight of the welded article. More specifically, there is a need for a weld filler metal that reduces residual stress and distortion in the weld joint of a welded article.

SUMMARY OF THE INVENTION

The present invention is directed to a weld filler metal that reduces residual stress and distortion in a welded article. The filler metal of the present invention compensates for shrinkage which normally occurs during cooling by the formation of low carbon martensite during solidification and cooling. The volumetric increase caused by the allotropic transformation of austenite to martensite during solidification and cooling of the filler metal can compensate for the volumetric shrinkage that otherwise occurs due to the shrinkage of the solidified weld material with decreasing temperature.

In accordance with one aspect of the invention, a filler metal for use in welding steel is disclosed. The filler metal contains not more than about 0.1% C, not more than about 1% Si, not more than about 0.8% Mn, from about 10.5–13% Cr, from about 0.65% to about 4% Ni, from about 10 times the weight percent C (hereafter "10 (% C)") to about 1.5% Ti, and not more than about 0.5% each of N, P, S, Mo, Nb, Cu, V, or Co, wherein each symbol of an element indicates the weight percent of the element. The remainder of the filler metal is essentially iron and inevitable impurities. The filler metal, when melted and cooled, produces an as deposited microstructure comprising some fraction of martensite wherein the accompanying expansion and volume increase offsets at least some of the shrinkage associated with cooling of the weld.

The present invention is also directed to a method of attaching together two components. The method includes the steps of using a filler metal when welding together the two components. The weld comprises an amount of martensite sufficient to increase the volume of the weld thereby at least partially offsetting shrinkage of the weld upon cooling. In accordance with particular aspects of the invention, the components are stainless steel or mild steel. In accordance with a specific embodiment of the invention, the first component is an exhaust tube and the second component is a flange for use in an automotive exhaust system.

The present invention also provides for a welded stainless steel article comprising a first low carbon stainless steel component welded to a second low carbon steel component by a stainless steel weld material located in a weld joint between the first and second components wherein the weld joint comprises from about 20–60% martensite by volume. In accordance with certain aspects of this embodiment, the stainless steel weld material may comprise less than 0.1% C, from about 8–13% Cr, and from about 0.30–4% Ni by weight. The low carbon stainless steel component may comprise not more than about 0.1% C, from about 10.5–13% Cr, and not more than about 0.6% Ni.

The filler metal may be applied to the components to be welded by various conventional means. A particularly useful welding procedure is gas metal arc welding (GMAW, also referred to as MIG welding). MIG welding is a process in which the heat for welding is generated by an arc between a consumable filler metal and the work metal. The filler metal is continuously fed to the weld area and formed to the weld with some dilution from the base metal. The electrode, weld metal, arc and adjacent areas of the base metal are protected from atmospheric contamination by a gaseous shield provided by a gas stream comprising a mixture of inert gases. Other welding processes, including but not limited to GTAW or TIG, are also useful in accordance with the present invention.

BRIEF DESCRIPTION OF THE DRAWING

The FIGURE is a schematic, side cross-sectional view of a first component in the form of a tube and a second member in the form of a flange attached together in accordance with one aspect of the present invention.

DETAILED DESCRIPTION OF THE INVENTION

Figure 1:
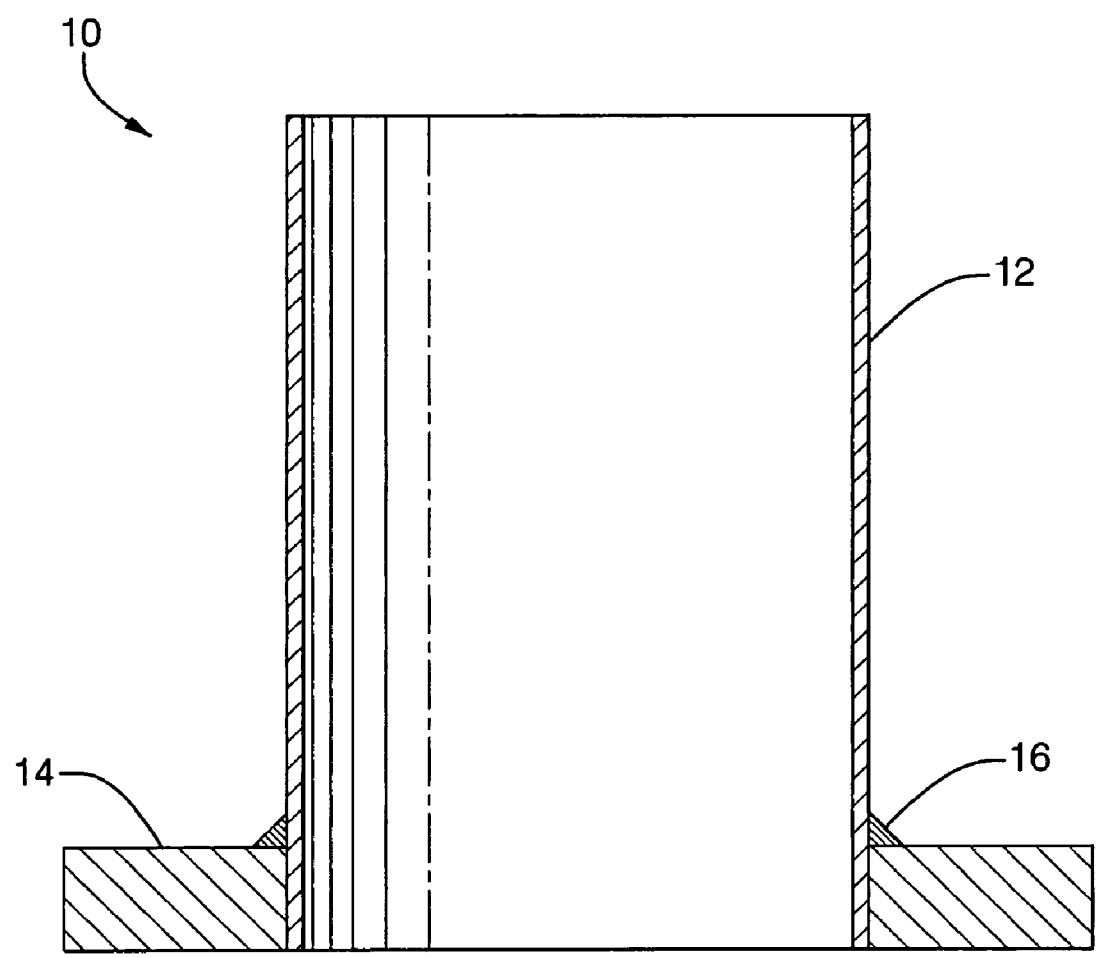

All documents cited are, in relevant part, incorporated herein by reference; the citation of any document is not to be construed as an admission that it is prior art with respect to the present invention.

The term "weld" as used herein refers to a "localized coalescence of metals or non-metals produced . . . by heating the materials to the welding temperature." 1 AMERICAN WELDING SOCIETY, WELDING HANDBOOK, 573–74 (8th ed. 1987). The term "weld pool" refers to "[t]he localized volume of molten metal in a weld prior to its solidification as weld metal." Id. The composition and microstructure of the filler metal can be determined in accordance with the test method for chemical analysis described in Section 3.3 of "Specification for Flux Cored Corrosion-Resisting Chromium and Chromium-Nickel Steel Electrodes," American Welding Society, AWS A5.22–80, 1–10 (1980) (AWS A5.22, § 3.3). The described procedure comprises depositing weld test pads in layers and obtaining a sample for analysis from a layer free from foreign matter. This term is distinguishable from the term "forming a weld" which typically involves some dilution of the composition used to form the weld because of dilution from the base materials being joined with the weld.

The present invention provides a filler metal for use in welding steel or stainless steel components wherein the filler metal produces a weld comprising martensite. The formation of low carbon martensite in the weld creates a volumetric change that results in a compressive stress in the surrounding base material. The compressive residual stress counteracts the tensile residual stress in the part and minimizes distortion.

Various approaches are available to modify a filler metal formulation to provide a volume increase to offset shrinkage of the weld during cooling. One of the most effective approaches is to increase the amount of nickel in the filler metal. AWS/ANSI standard 409 stainless steel filler metal has 0.6% Ni maximum and is typically supplied at a nickel level of about 0.2%. The standard 409 stainless steel solidifies as ferrite and remains ferrite upon cooling. Increasing the amount of nickel in the filler metal significantly increases the austenite forming tendency and correspondingly the amount of martensite formed upon cooling which increases the weld volume. At about 0.45% Ni the modified 409 stainless steel filler metal solidifies with about 37% austenite which undergoes allotropic transformation to martensite upon cooling beginning at about 315° C. By increasing the amount of nickel in the filler metal, corresponding increases in austenite and martensite can be obtained. For example, a modified 409 stainless steel filler metal including 0.75% nickel solidifies with about 45% austenite resulting in a weld containing about 45% martensite on cooling. Accordingly, by adjusting the nickel content in a filler metal one can produce proportional changes in austenite upon solidification and corresponding changes in the amount of martensite on cooling. This facilitates the preparation of modified stainless steel filler metal compositions providing favorable dimensional change characteristics to offset shrinkage that otherwise occurs during cooling of the weld.

The content of other "austenite former" elements can also be adjusted to increase the austenite forming tendency of the filler metal. The austenite forming tendency in a composition is related to the nickel equivalent factor as determined by the formula:

Ni eq=% Ni+0.5(% Mn)+30(% C)+30(% N-0.06)

N. Suutala et al., *The Relationship between Solidification and Microstructure in Austenitic and Austenitic-Ferritic Stainless Steel Welds,* 10A Metallurgical Transactions A 512 (1979).

Accordingly, a modified 409 stainless steel filler metal composition providing the same level martensite as a 409 filler metal with 0.75% nickel could be obtained in a composition having a nickel content of about 0.2% by increasing the concentration of Mn by 1.2%.

Another option for modifying the amount of austenite formed and martensite formed upon cooling is by decreasing the chromium equivalent factor where:

Cr eq=% Cr+% Mo+1.5(% Si)+0.5(% Nb)+2(% Ti)

Decreasing the chromium equivalent factor would result in an increase in the formation of austenite and subsequently the formation of martensite in the finished weld. However, reducing the percent Cr below the current range of about 11–14% could have a deleterious effect on the oxidation resistance of the weld.

Accordingly, the ability to adjust the percent martensite in the finished weld by adjusting the chromium equivalent factor is somewhat limited.

The volume increase associated with the transformation of austenite to martensite is estimated to be about 4.4%. Accordingly, the increase in volume associated with a percentage of martensite in the filler metal can be calculated. For example, a modified 409 stainless steel filler metal with 0.45% nickel results in a weld containing approximately 37% martensite. The estimated volumetric increase associated with this level of martensite is approximately 1.6% as compared to benchmark 409 stainless steel filler metal. The volumetric increase associated with the allotropic transformation of austenite to martensite can be used to offset the volumetric shrinkage that otherwise occurs due to the shrinkage of the solidified weld material with decreasing temperature. The amount of weld shrinkage can be estimated using the approximate melting temperature of 409 stainless steel of 1221° C. and a coefficient of thermal expansion of $13.5 \times 10^{-6}/°$ K. Accordingly, from 1221° C. to 21° C. (solidification temperature to room temperature) net contraction amount across a 409 stainless steel weld is approximately 1.6%. The present invention provides a method for reducing the distortion in a joint from the weld to near zero by adjusting the amount of allotropic transformation of austenite to martensite to balance shrinkage with expansion forces. In the present example, a martensite content of about 37% provides a volumetric increase of about 1.6% which corresponds to the calculated shrinkage of the weld on cooling, of course, one of skill in the art can determine the % martensite required to offset shrinkage with other compositions.

The present invention provides a filler metal composition for use in welding steel in which the individual alloying elements have been selected and provided at concentrations which create a suitable martensite level to offset shrinkage of the weld which otherwise occurs upon cooling. The increase in volume to offset shrinkage has been achieved while retaining acceptable physical properties for the weld.

In accordance with one embodiment of the present invention, a low carbon stainless steel exhaust tube and a low carbon mild steel or stainless steel flange are welded together using a martensite-forming filler metal in accordance with the invention. The filler metal produces a weld joint between the two components wherein the weld joint contains an amount of martensite sufficient to increase the volume of the weld thereby partially offsetting shrinkage of the weld upon cooling.

FIG. 1 depicts this embodiment comprising a welded article 10. Welded article 10 includes an exhaust tube 12 and a flange 14 welded together by weld joint 16. Welded article 10, by incorporating martensite-containing weld 16, exhibits reduced residual stress and distortion.

In accordance with a particular embodiment of the invention, the exhaust tube 12 comprises a low carbon stainless steel such as SAE 409 stainless steel and the flange 14 comprises a mild steel such as SAE 1008. 409 stainless steel typically has the following chemical composition: not more than about 0.10% C, from about 10.5–13% chromium, not more than about 0.6% Ni, not more than about 0.5% Mo, not more than about 0.8% Mn, not more than about 1.0% Si, not more than about 0.04% P, not more than about 0.03% S, not more than about 0.5% Cu, from about 10(% C) to 1.5% Ti and balance essentially iron. SAE 1008 typically has the following chemical composition: not more than 0.09% C, from about 0.3–0.5% Mn, not more than about 0.03% S, not more than about 0.02% P, not more than about 0.10% Si, not more than about 0.15% Cr, not more than about 0.15% Ni, not more than about 0.25% Cu and balance essentially iron.

The composition filler metal will vary depending on the composition of the base metals being welded. The weld will typically contain some components from each of the base metals which tend to dilute the filler metal composition. The contribution of the base metals to the composition of the weld joint should be taken into consideration when formulating a filler metal composition to provide a certain level of martensite. The dilution level will vary with the particular components and welding operation. Dilution of filler metals during welding is described in 4 AMERICAN WELDING SOCIETY, WELDING HANDBOOK, 514–15 (7th ed. 1987). In accordance with the embodiment described about wherein a 409 stainless tube is welded to a SAE 1008 flange, the filler metal composition will typically fall within one of the ranges set forth in Table 1 wherein single digit values represent maximum values.

TABLE 1

Filler Metal Compositions

| ELEMENT | BROAD RANGE % | INTERMEDIATE RANGE % | NARROW RANGE % |
|---|---|---|---|
| C | 0.1 | 0.1 | 0.05–0.07 |
| Si | 1 | 1 | 0.4–0.6 |
| Mn | 0.8 | 0.6 | 0.4–0.6 |
| Cr | 10.5–13.0 | 11.75–12.75 | 12.2–12.3 |
| Mo | 0.5 | 0.5 | 0.2–0.4 |
| N | 0.2 | 0.15 | 0.05–0.15 |
| Nb | 0.5 | 0.4 | 0.1–0.3 |
| Ti | 10(% C)–1.5 | 1.0–1.5 | 1.2–1.3 |
| Cu | 0.5 | 0.25 | 0.05–0.15 |
| V | 0.5 | 0.5 | 0.1–0.3 |
| Co | 0.5 | 0.5 | 0.3–0.5 |
| P | 0.04 | 0.04 | 0.01–0.03 |
| S | 0.03 | 0.03 | 0.01–0.02 |
| Ni | 0.65–4.0 | 1.6–2.2 | 2.0–2.2 |
| Fe | balance | balance | balance |

In accordance with this embodiment, the elements not listed in Table 1 are limited to less than 0.5% by weight. The filler metal composition of the present invention may comprise, consist essentially of, or consist of the elements set forth in the broad, intermediate or narrow ranges. Furthermore, any one or more of the narrow or intermediate ranges indicated above can be used with any one of more of the broad ranges for the remaining elements as set forth above.

While the invention has been described with reference to the preferred embodiments, it will be understood by those skilled in the art that various changes may be made and equivalents may be substituted for elements thereof without departing from the scope of the invention. For example, while the preferred embodiments are directed towards welding a low carbon stainless steel component to a low carbon steel component using a stainless steel weld material, it should be noted that the invention is equally applicable to other steel components wherein shrinkage of the weld during cooling causes residual stress or distortion.

In addition, many modifications may be made to adapt a particular situation or material to the teachings of the invention without departing from the scope of the invention. Therefore, it is intended that the invention not be limited to the particular embodiments disclosed herein, but that the invention will include all embodiments falling within the scope and spirit of the appended claims.

What is claimed is:

1. A method of attaching together two components comprising the steps of:
   a) providing a first component;
   b) providing a second component;
   c) placing a filler metal between said first component and said second component; said filler metal comprising:
      from about 0.05% to about 0.1% C;
      not more than about 1.0% Si;
      not more than about 0.8% Mn;
      from about 10.5% to about 13.0% Cr;
      from about 0.65% to about 4.0% Ni;
      from about 1.0% to about 1.5% Ti;
      not more than about 0.5% each of N, S, P, Mo, Nb, Cu, V, or Co; and
      balance essentially Fe; and
   d) welding the filler metal to form a weld between said first component and said second component thereby attaching together said components;
   wherein said weld comprises an amount of martensite sufficient to increase the volume of the weld thereby at least partially offsetting shrinkage of the weld upon cooling.

2. The method of claim 1 wherein said weld comprises from about 20–60 percent martensite based on the total volume of the weld.

3. The method of claim 1 wherein said weld comprises from about 30–40 percent martensite based on the total volume of the weld.

4. The method of claim 1 wherein said filler metal comprises not more than 0.6% Mn, from about 11.75% to about 12.75% Cr, and from about 1.6% to about 2.2% Ni.

5. The method of claim 4 wherein said filler metal comprises:
   from about 0.05–0.07% C
   from about 0.4–0.6% Si;
   from about 0.4–0.6% Mn;
   from about 12.2–12.3% Cr;
   from about 0.2–0.4% Mo;
   from about 1.2–1.3% Ti;
   from about 0.01–0.03% P;
   from about 0.01–0.02% S; and
   from about 2.0–2.2% Ni.

6. The method of claim 1 wherein said first component comprises stainless steel and the second component comprises stainless steel or mild steel.

7. The method of claim 6 wherein said first component is a tube.

8. The method of claim 6 wherein said second component is a flange.

9. The method of claim 6 wherein the first component is an exhaust tube and the second component is a flange for use in an automotive exhaust system.

10. The method of claim 1 wherein step d) comprises welding the filler metal using a gas metal arc welding process.

11. The method of claim 1 wherein step d) comprises:
melting at least a portion of each of the filler metal, the first component and the second component thereby forming a puddle of molten steel, which solidifies and cools to form the weld.

12. The method of claim 11 wherein austenite forms in the puddle of molten steel as it solidifies and the austenite transforms into martensite with an accompanying expansion in volume as the puddle cools.

13. The method of claim 12 wherein said weld comprises from about 20–60 percent martensite based on the total volume of the weld.

14. The method of claim 13 wherein said weld comprises from about 30–40 percent martensite.

15. A welded article made according to the method of claim 1.

16. A welded stainless steel article comprising:
a first low carbon stainless steel component welded to a second low carbon steel component by a stainless steel weld material located in a weld joint between the first and second components wherein the weld joint comprises from about 20–60 percent martensite by volume, said stainless steel weld material comprising from about 0.05% to about 0.1% C;

not more than about 1.0% Si;

not more than about 0.8% Mn;

from about 10.5% to about 13.0% Cr;

from about 0.65% to about 4.0% Ni;

from about 1.0% to about 1.5% Ti;

not more than about 0.5% each of N, S, P, Mo, Nb, Cu, V, or Co; and balance essentially Fe.

17. The article of claim 16 wherein said first component is an exhaust tube and said second component is a flange.

18. The article of claim 16 wherein said first low carbon stainless steel component comprises not more than about 0.10% C, from about 10.5–13.0% Cr, and not more than about 0.6% Ni and said second low carbon steel component comprises not more than about 0.09% C, not more than about 0.15% Cr and not more than about 0.15% Ni.

* * * * *